Nov. 19, 1940.   F. S. GREEN   2,222,312
CIRCUIT BREAKER
Filed June 7, 1937   12 Sheets-Sheet 1

INVENTOR.
FLOYD S. GREEN
BY
Roy M. Eilers
ATTORNEY.

Nov. 19, 1940.   F. S. GREEN   2,222,312
CIRCUIT BREAKER
Filed June 7, 1937   12 Sheets-Sheet 2

INVENTOR.
FLOYD S. GREEN
BY
Roy M. Eilers
ATTORNEY.

Nov. 19, 1940.  F. S. GREEN  2,222,312
CIRCUIT BREAKER
Filed June 7, 1937   12 Sheets-Sheet 3

INVENTOR.
FLOYD S. GREEN
BY
Roy M. Eilers
ATTORNEY

Nov. 19, 1940.  F. S. GREEN  2,222,312
CIRCUIT BREAKER
Filed June 7, 1937   12 Sheets-Sheet 4

Fig. 12.

INVENTOR.
FLOYD S. GREEN
BY
Roy M. Eilers
ATTORNEY.

Nov. 19, 1940.  F. S. GREEN  2,222,312
CIRCUIT BREAKER
Filed June 7, 1937    12 Sheets—Sheet 5

INVENTOR.
FLOYD S. GREEN
BY
Roy M. Eilers
ATTORNEY.

Nov. 19, 1940.    F. S. GREEN    2,222,312
CIRCUIT BREAKER
Filed June 7, 1937    12 Sheets-Sheet 6

INVENTOR.
FLOYD S. GREEN
BY
Roy M. Eilers
ATTORNEY.

Nov. 19, 1940.    F. S. GREEN    2,222,312
CIRCUIT BREAKER
Filed June 7, 1937    12 Sheets-Sheet 7

INVENTOR.
FLOYD S. GREEN
BY
Roy M. Eilers
ATTORNEY.

Nov. 19, 1940.   F. S. GREEN   2,222,312
CIRCUIT BREAKER
Filed June 7, 1937   12 Sheets-Sheet 8

INVENTOR.
FLOYD S. GREEN
BY
Roy M. Eilers
ATTORNEY.

Nov. 19, 1940.  F. S. GREEN  2,222,312
CIRCUIT BREAKER
Filed June 7, 1937  12 Sheets-Sheet 9

INVENTOR.
FLOYD S. GREEN
BY
Roy M. Eilers
ATTORNEY.

Nov. 19, 1940.  F. S. GREEN  2,222,312
CIRCUIT BREAKER
Filed June 7, 1937   12 Sheets-Sheet 11

INVENTOR.
FLOYD S. GREEN
BY
Roy. M. Eilers ATTORNEY

Nov. 19, 1940.   F. S. GREEN   2,222,312
CIRCUIT BREAKER
Filed June 7, 1937   12 Sheets-Sheet 12

INVENTOR.
FLOYD S. GREEN
BY
Roy M. Eilers
ATTORNEY

Patented Nov. 19, 1940

2,222,312

UNITED STATES PATENT OFFICE 2,222,312

CIRCUIT BREAKER

Floyd S. Green, St. Louis, Mo., assignor to Frank Adam, St. Louis County, Mo.

Application June 7, 1937, Serial No. 146,870

28 Claims. (Cl. 200—116)

This invention relates to improvements in circuit breakers, and more particularly to manually operable circuit breakers of an enclosed toggle operated type, which are actuated by a thermal element to open a circuit when a current in excess of a predetermined value flows therethrough.

It is an object of this invention to provide an improved circuit breaker possessing numerous advantages.

This invention provides a circuit breaker with means for releasing the circuit closing member, independently of the actuator handle, when a current in excess of a predetermined value flows through the circuit, making it possible to break the circuit in a shorter interval of time than if the entire actuator handle and mechanism had to be set in motion.

This invention also provides a circuit breaker with an indicating means visible from the front of the circuit breaker which will indicate when the circuit is opened due to excessive currents although the actuating handle remains in the normal "on" position.

The toggle action switch portion of the circuit breaker of this invention may be constructed with simple punchings having portions thereof extruded to form pivots, by which they may fit into cooperating portions of other punchings thus eliminating the necessity for riveting the parts together.

One form of circuit breaker provided by this invention may be constructed from a unitary housing with recesses formed in the housing material which serve as bearings to support the moving parts of the circuit breaker and thus obviate the necessity for providing a separate supporting member for the moving parts.

Another form of the invention, however, provides a housing into which a supporting member which carries the circuit breaker parts may be inserted and secured.

This invention provides a circuit breaker with an insulating housing into which the parts may be inserted and secured to the rear of the face of the housing so that the actuating handle of the circuit breaker will protrude through an opening in the face, this same face being adapted to form the front of a circuit breaker or panelboard section.

This invention also provides a circuit breaker in which the thermal element or current responsive device may be carried directly on the member on which the contacts are mounted and which is known as the contact carrier.

The circuit breaker provided by this invention also provides for a double break of the circuit by two contacts. This aids materially in reducing the arc formed on breaking the circuit and adds to the life of the circuit breaking contacts.

The resiliently mounted contacts used in this circuit breaker may be maintained under constant pressure by restraining members so that although a great pressure is not needed to close the circuit breaker nevertheless the contacts will not vibrate on their resilient mountings nor will they take up an unnecessary amount of room.

Further objects and advantages will appear from the following detailed description.

In the drawings.

In all of the figures the same reference numerals are used to denote similar parts.

Figure 4:
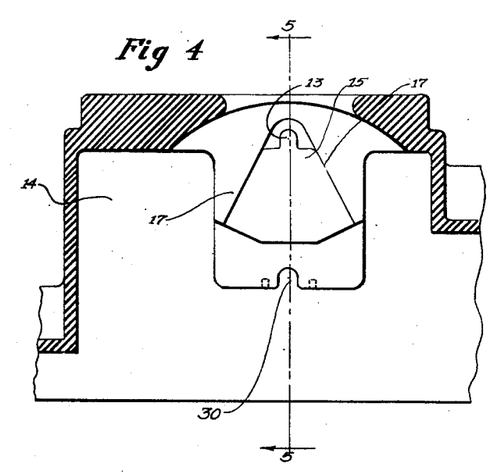
Figure 4 is a longitudinal cross-sectional view of the circuit breaker housing with the operating mechanism removed therefrom.
Figure 5:
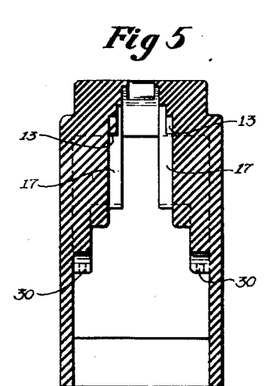
Fig. 5 is a cross-sectional view taken along line 5—5 of Fig. 4.

Referring now to the drawings the numeral 1 indicates an actuator which may have an insulating handle 3 pressed or cast there-around, or which may be moulded with a slot therein adapted to fit over the actuator. A protecting shield 5 may be formed integral with the handle and may serve to confine any arc within the circuit breaker housing. A spring 7 connects the actuator with a swinging member 9 for over-center operation. The swinging member is provided with extruded portions 11 which serve as pivots around which the member swings when the extruded portions rest in recesses 13 (see Figures 4 and 5) which may be formed in the housing 14. The swinging member operates in a recess 15 in the sidewall of the insulated housing and its motion is limited by walls 17 of these recesses. Openings 19 are provided in the swinging member to allow the links 21 to pivot on extruded portions 23 thereof in the openings 19. A pivot pin 24 furnishes an axis for the actuator 1, a pivotal member 26 and a contact carrier 28, later to be described. The pivot pin 24 may rotate or be supported in recesses 30 (see Figures 4 and 5) of the insulating housing 14.

Figure 6:
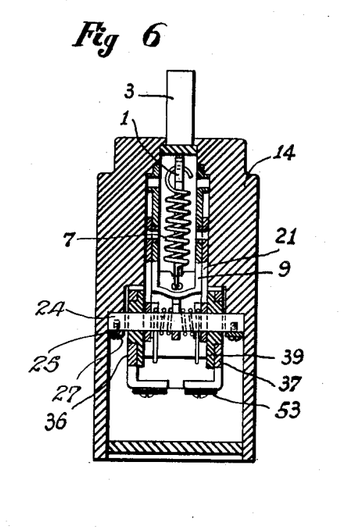
Fig. 6 is a cross-sectional view taken along line 6—6 of Fig. 1.
Figure 7:
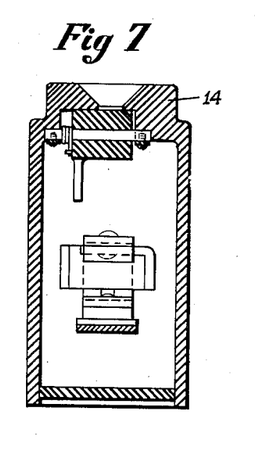
Fig. 7 is a cross-sectional view taken along line 7—7 of Fig. 1.
Figure 8:
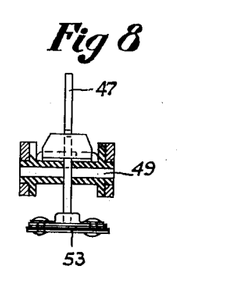
Fig. 8 is a cross-sectional view taken along line 8—8 of Fig. 1.
Figure 9:
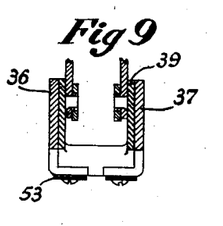
Fig. 9 is a cross-sectional view taken along line 9—9 of Fig. 1.
Figure 10:
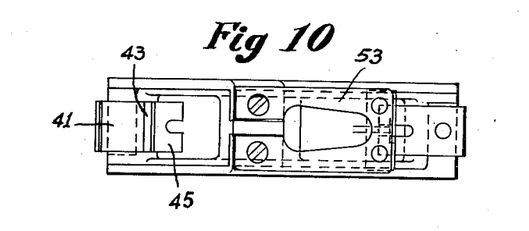
Fig. 10 is a view of the underside of the circuit breaker contact carrier.
Figure 12:
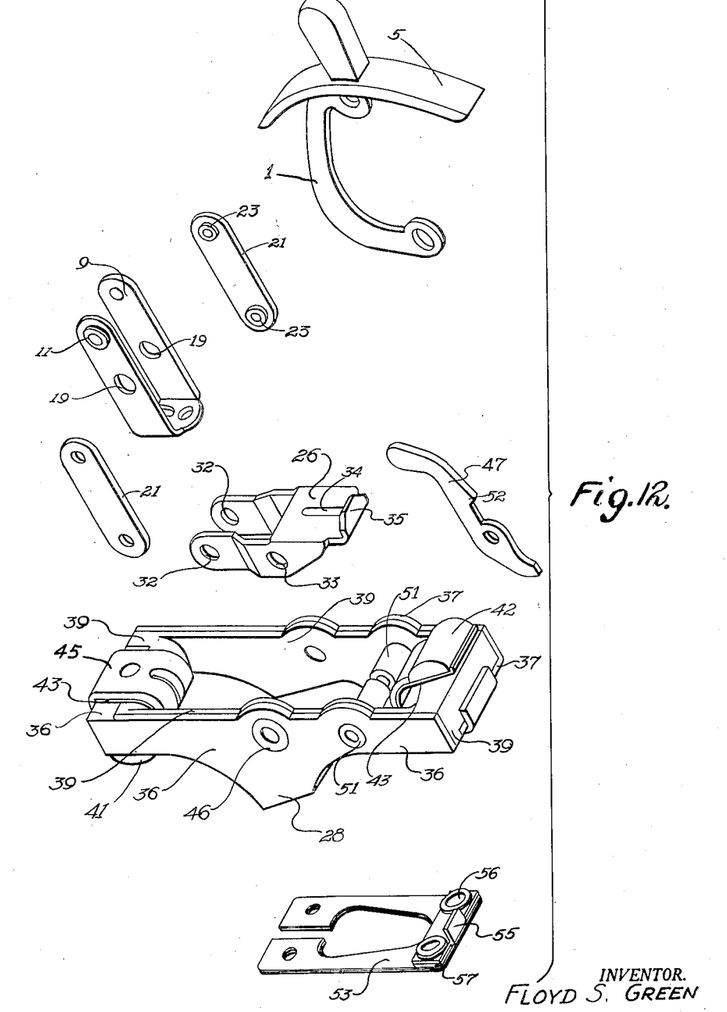
Fig. 12 is an exploded view of the various circuit breaker parts.
Figure 13:
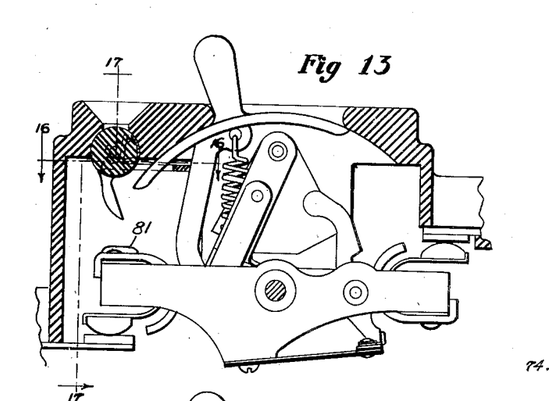
Fig. 13 is a side view of the circuit breaker operating mechanism with the supporting housing in cross-section, in this view the actuator handle is in the "on" position and the circuit contacts are closed.
Figure 14:
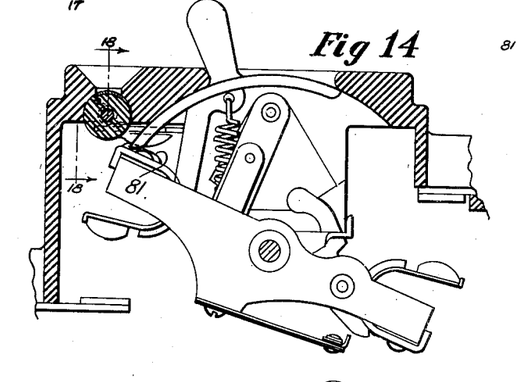
Fig. 14 is a view similar to Fig. 13 except that the contact carrier is in the tripped position.
Figure 21:
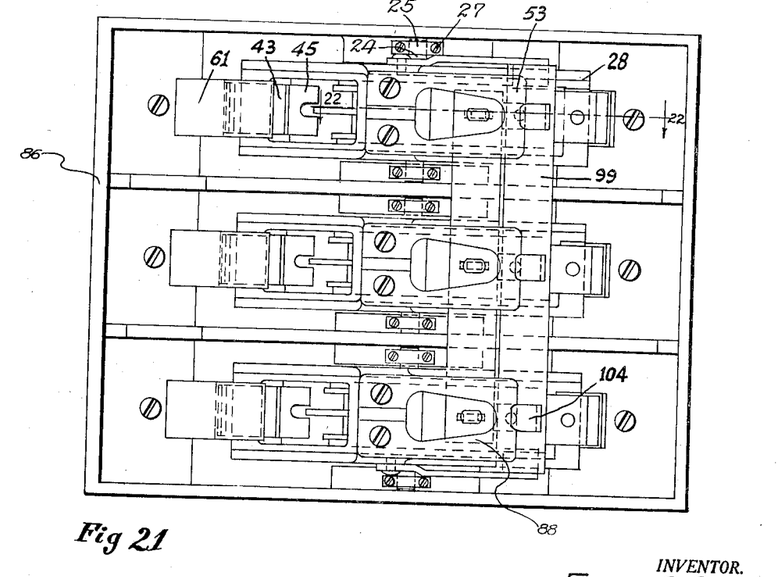
Fig. 21 is a bottom view of the circuit breaker of the type shown in Fig. 20.

The pivot pin 24 may be held in position by a strap 25 secured in the housing by screws or pins 27 (see Figs. 6 and 21). Other ways of securing said pin in position will later be shown. The pivotal member is provided with openings 32 (see Fig. 12) which accommodate extruded portions 23 on the links 21. Openings 33 in the pivotal member allow the pivot pin 24 to pass therethrough. An opening 34 and a lip 35 are also provided on the pivotal member. The contact carrier 28 may comprise two frame members 36 and 37, which are suitable for conducting electrical current, separated by a frame 39 of insulating material. Two electrical contacts, 41 and 42, are electrically connected to the frame members 36 and 37 by springs 43. Spring restricting members 45 maintain a flexure of the springs 43 when the contacts are open and thus prevent periodic vibration of the contacts when the circuit breaker is opened.

The contact carrier oscillates on the pin 24 which passes through insulated bushings 46 in the contact carrier.

A latch bar 47 is supported by a pin 49 which passes through the insulated bushings 51. The latch bar passes through the opening 34 in the pivotal member 26 and has a projection 52 which cooperates with the lip 35 of the pivotal member.

A thermal trip element 53 of suitable bi-metallic material which will warp when more than a predetermined amount of current flows through it, may have a catch 55 secured thereto as shown by rivets 56. The catch may be of some suitable metal and insulated from the bi-metal by a strip of mica 57. The thermal trip element 53 may be secured to the conducting bars 36 and 37 by screws 59. It is thus apparent that any current passing from the contact 42 must flow through the conducting bars 36 and 37 and around the bi-metallic member 53. Stationary contacts 61 and 63 may be secured to the housing 14 by suitable means as by a nut 64 and bolt 65. A housing closure member or cover 67 may completely close the back of the housing 14. A spring 69 tends to rotate the contact carrier 28 on its pivot.

Before the various auxiliary indicating devices and plural types of breakers are described, the operation of a single breaker of the above type will be described.

Figure 1:
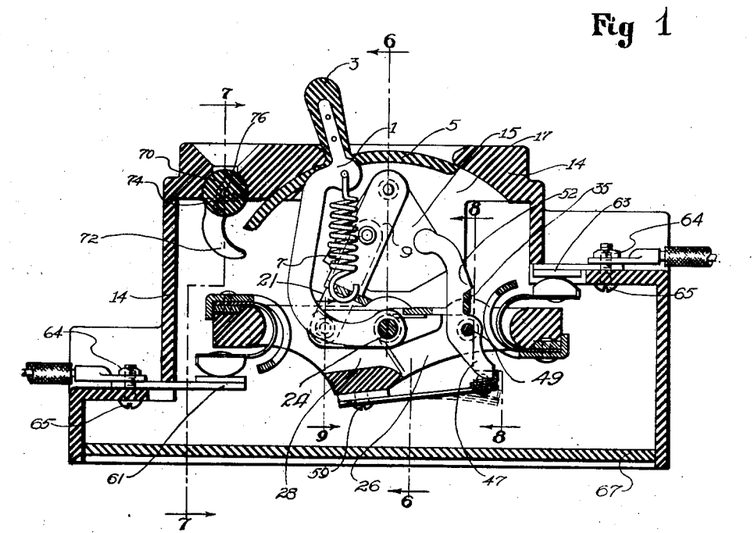
Figure 1 is a longitudinal cross-section through the central portion of a circuit breaker incorporating the features of this invention.
Figure 3:
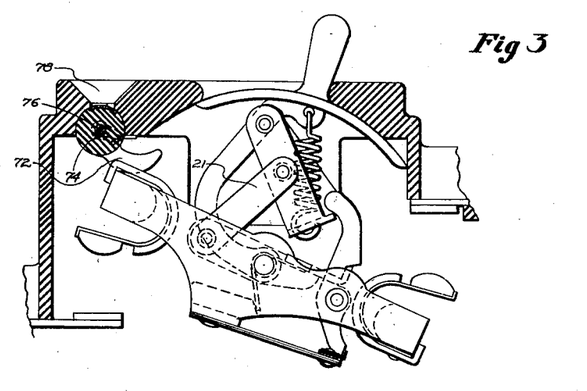
Fig. 3 is a view similar to Fig. 2 except that the actuator handle is in the "off" position.

Figure 1 shows the circuit breaker in the closed position. In this position the catch 55 on the thermal element holds the latch bar in the position shown, that is, with the projection 52 engaging the lip 35. If the actuator 1 is moved, the spring 7 and swinging member 9 provide an over-center spring actuating means which, through the toggle links 21 and pivotal member 26, move the contact carrier to the open position as shown in Fig. 3. Thus under normal conditions when the thermal trip element 53 engages the latch bar 47, the circuit breaker operates as a simple snap-acting switch providing a double break for the circuit.

Figure 2:
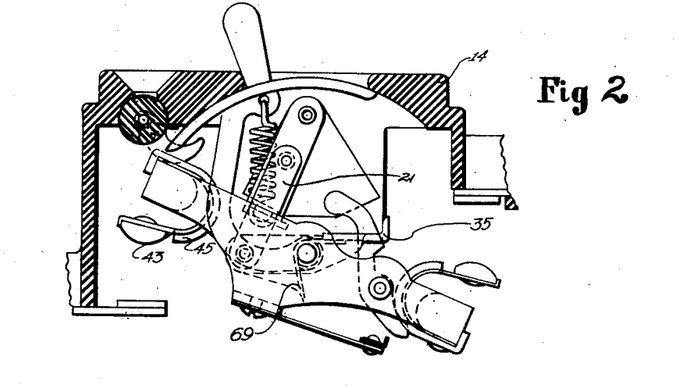
Figure 2 is a longitudinal view taken in cross-section through a portion of the circuit breaker housing but taken as a side view of the circuit breaker operating mechanism, in this view the actuator handle is in the "on" position but the circuit breaker is on the tripped position.

All the current flowing from one contact of the circuit breaker to the other contact must pass through the thermal element and will cause a certain amount of heating of the thermal element. The thermal element for any particular size of circuit breaker is designed so that a flow of current in excess of a predetermined amount will cause the bi-metal to warp and so that the catch 55 will release the latch bar 47. The spring 69 will cause the lip 35 of the pivotal member to push the latch member into the position shown in Fig. 2. This will occur as soon as the latch bar is released because of the slope given to the portion of the lip 35 which engages the projection 52. As soon as the pivotal member 26 is out of engagement with the latch bar, the contact carrier will swing to the open position due to the action of the spring 69. The entire cycle of events occurs instantaneously and the circuit is opened before the abnormal current can cause any damage. An illustration of the circuit breaker in this tripped position is shown in Fig. 2. The actuator handle remains in the "on" position and the circuit breaker must be reset before it may operate again either as a circuit breaker or switch. The circuit breaker is reset by moving the actuator handle to the "off" position which lowers the pivotal member and causes the swinging member 9 to strike the latch bar and return it to the latched position as shown in Fig. 3. If the thermal element has cooled sufficiently, the catch will again engage the latch bar.

An indicator on the face of the circuit breaker may be desirable and several forms thereof will be described.

A simple form of indicator is shown in Figures 1-3. It will indicate whether the contact carrier is in the open or closed position but will not distinguish between the open or tripped position. If the actuator handle is in the "on" position and the indicator shows that the contact carrier is in the open position as in Fig. 2, however, it will be apparent to an observer that the breaker is in the tripped position.

This form of indicator comprises an indicator cylinder 70 upon which a suitable legend may be printed, a tail bar 72 secured thereto, a spring 74 and pivot pins 76 which may rest in recesses in the housing 14. A window 78 in the housing allows the cylinder 70 to be seen. The indicator cylinder 70 is maintained in the position in which it is shown in Fig. 1 by the spring 74. When the contact carrier is in the open position as shown in Fig. 2 or 3 it strikes the tail bar 72 and moves the indicator cylinder so that any suitable legend or indication thereon will become visible.

An indicator which will indicate when the contact carrier is in the "tripped" position may be provided and such an arrangement is shown in Figures 13–18.

Figure 15:
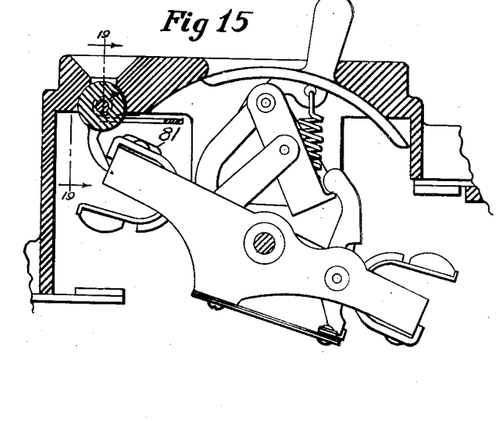
Fig. 15 is similar to Fig. 14 except that the actuator handle is in the "off" position.
Figure 16:
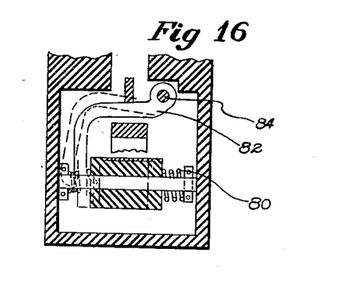
Fig. 16 is a view taken along line 16—16 of Fig. 13.
Figure 17:
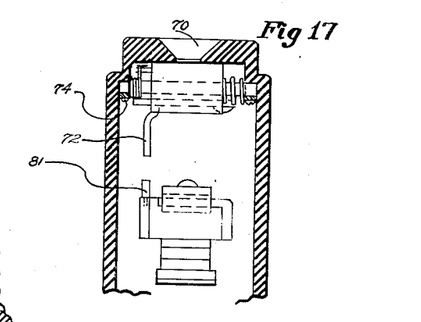
Fig. 17 is a view taken along line 17—17 of Fig. 13.
Figure 18:
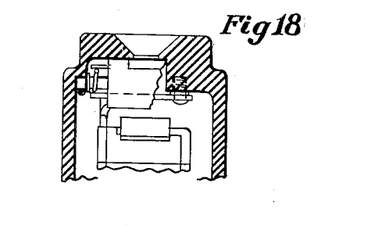
Fig. 18 is a view taken along line 18—18 of Fig. 14.
Figure 19:
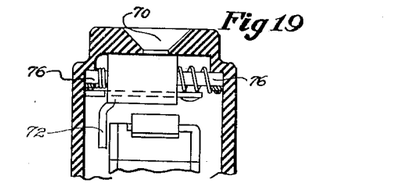
Fig. 19 is a view taken along line 19—19 of Fig. 15.
Figure 20:
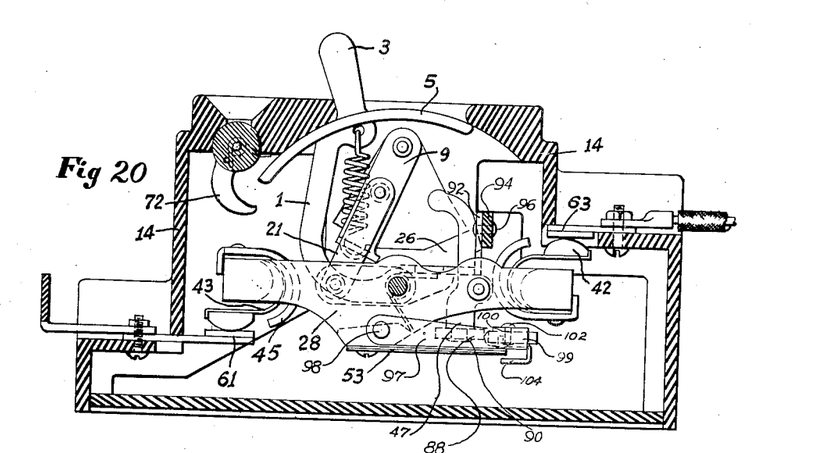
Fig. 20 is a side view of the operating mechanism and a cross-section of the housing of a circuit breaker which may be operated simultaneously with a plurality of similar breakers.

In these figures a spring 80 is provided which prevents a projection 81 on the contact carrier from engaging the tail bar 72 when the actuator handle is in the "off" position as in Figs. 15 and 19. A lever 82 pivoted on a pin 84 secured to the main housing is positioned as shown so that when the actuator handle is in the "on" position it causes the lever 82 to push the control cylinder against the action of the spring 80 bringing the tail bar 72 into the path of the projection 81 on the contact carrier so that when it is tripped, the indicator will give notice of the fact.

When a 3 wire or 3 phase circuit is equipped with circuit breakers of the type shown with the handles connected together or replaced by a common handle it is desirable that all of the breakers open simultaneously. Such an embodiment of the invention is shown in Figs. 20–25 where a housing 86 of insulating material and adapted to house 3 circuit breakers may be used. A strip of "Bakelite" 88 or other insulating material is secured to the bottom of each latch bar as by rivets 90.

The pivotal member 26 is slightly changed in form from the pivotal member previously described, projections 92 being provided to which a strip of "Bakelite" 94 or other insulating material may be secured as by rivets 96. Arms 97 arranged to oscillate about an axis 98 serve as supports for a "Bakelite" or insulating strip 99 which is supported thereon by angles 100 and rivets 102.

A catch 104 is secured to the strip 99 by rivets 106 at points where each thermal element may engage its corresponding catch. In such an embodiment of the invention the thermal element need not be equipped with the catch 55. In operation such a multiple breaker will break all lines simultaneously should the current through any one of the lines exceed a predetermined value. When any one of the thermal elements warp the trip bar 99 is pulled down and allows the latch bar 47 to move so as to allow the pivotal member to be released which in turn opens the circuit breaker. Since all the trip mechanisms, latch bars, and pivotal members are connected, simultaneous opening of all of the breakers is insured.

Another method of accomplishing simultaneous operation of the breakers is shown in Figures 26–32 as applied to a double pole circuit breaker. The latch bar 47 as used in this embodiment is not provided with the projection 52 as in the other embodiments shown. The function of this projection is fulfilled by a catch bar 108 as shown. A connecting bar 110 of suitable insulating material as "Bakelite" is secured as by rivets 111 to the bottom of each catch bar. A trigger bar 113 is supported by a pin 115 in the connecting bar. In this embodiment the thermal element 53 is provided with a catch 55 which engages the foot of the latch bar 47. Since the catch bars 108 are connected movement of one will cause simultaneous movement of the other and hence simultaneous opening of all the poles of the circuit breaker. Since the trigger bar 113 is pivotally supported, it will allow movement of one of the latch bars 47 without simultaneous movement of the other. Hence both thermal elements need not warp simultaneously to affect simultaneous operation of all poles of the circuit breakers.

Figure 26:
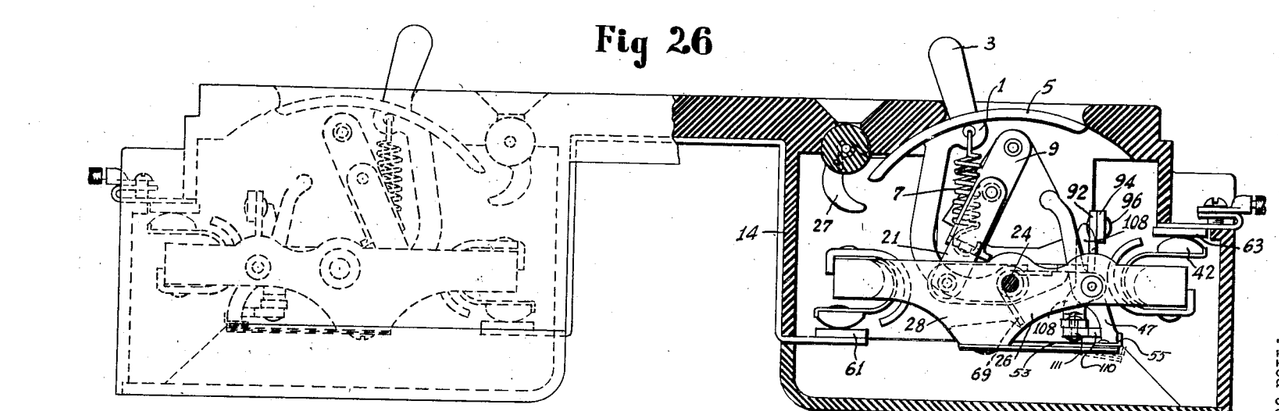
Fig. 26 is a side view of the operating mechanism and a cross-section of the housing of a circuit breaker arranged to operate simultaneously with another similar breaker. A complete panelboard section is shown in this view.
Figure 27:
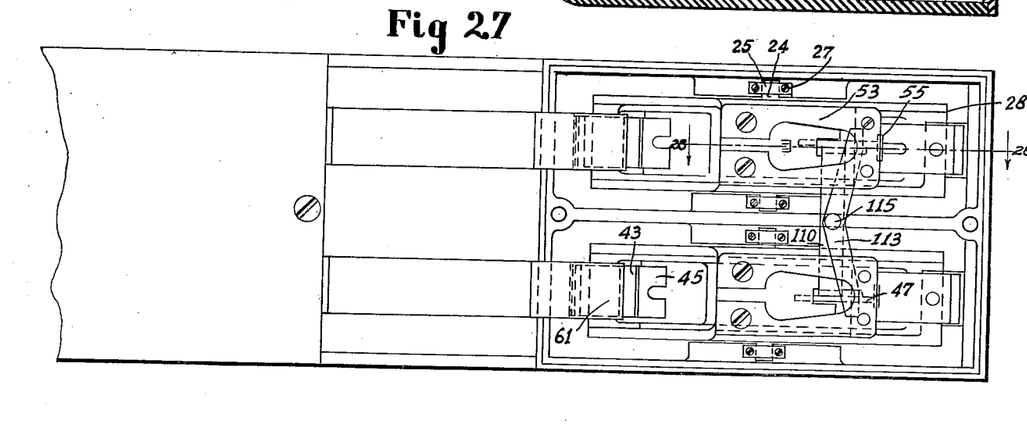
Figure 27 is a bottom view of the two breakers shown in Fig. 26.
Figure 28:
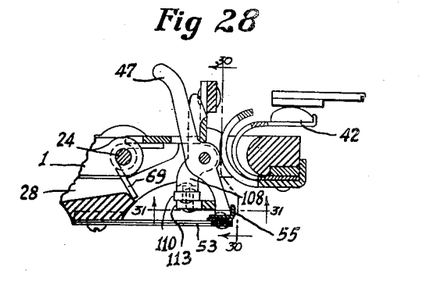
Fig. 28 is a view taken along line 28—28 of Fig. 27.
Figure 29:
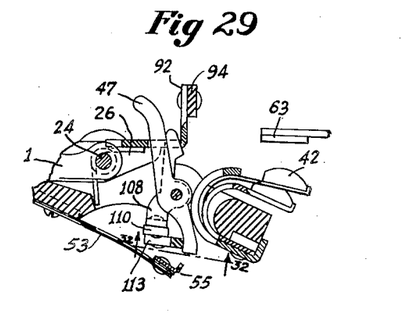
Fig. 29 is a view similar to Fig. 28 but with the circuit breaker in the tripped position.

The Figures 26 and 27 further illustrate the novel way in which the breaker parts are inserted from the rear of the housing as well as showing a housing which may be formed for insertion in a standard type of panelboard.

Figure 11:
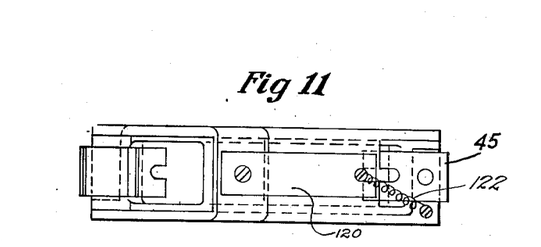
Fig. 11 is a view of the contact carrier provided with an optional form of thermal element.

A modification in the form of the thermal element is shown in Figure 11 where the numeral 120 designates a straight thermal element secured to the contact carrier. The circuit through the thermal element is completed through a pigtail 122.

Figures 30, 31, 32, 33:
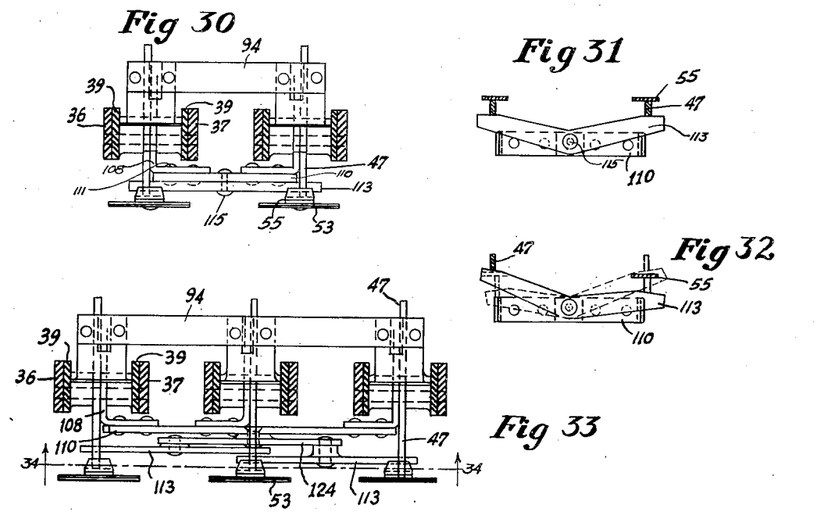
Fig. 30 is a view taken along line 30—30 of the Fig. 28.
Fig. 31 is a view taken along line 31—31 of Fig. 28
Fig. 32 is a view taken along line 32—32 of Fig. 29.
Fig. 33 is a view of an optional form of trip mechanism.
Figure 34:
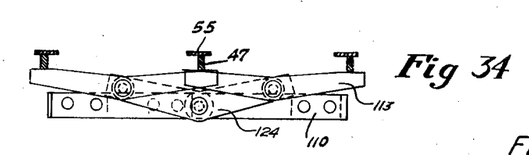
Fig. 34 is a view along line 34—34 of Fig. 33.

Figures 33 and 34 illustrate a circuit breaker for three-pole simultaneous break similar to the type shown in Figures 26–32. An additional trigger bar 124 is provided in this embodiment. The trigger bars which function similar to the trigger bar 113 in Figures 26–32 are pivoted on this bar 124. The operation of this embodiment is then similar to that of the device shown in Figures 28–32.

Figure 22:
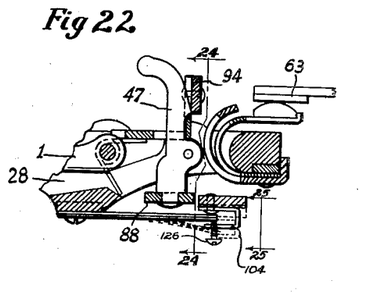
Fig. 22 is a view taken along line 22—22 of Fig. 21.
Figure 23:
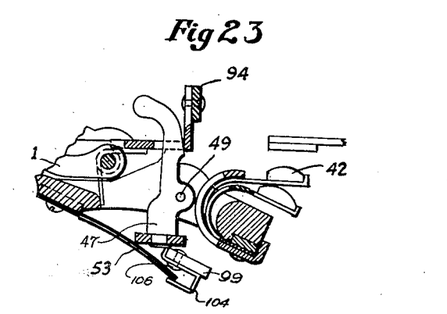
Fig. 23 is similar to Fig. 22 but the contact carrier is in the tripped position.
Figure 24:
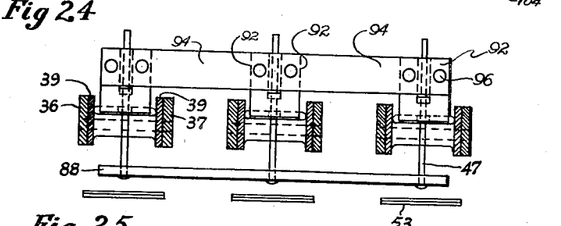
Fig. 24 is a view taken along line 24—24 of Fig. 22.
Figure 25:
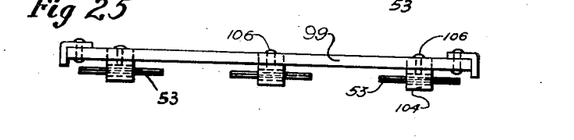
Fig. 25 is a view taken along line 25—25 of Fig. 22.

Figure 22 shows one method of applying a set screw 126 to the member 104 to provide a means for varying the adjustment of the circuit breaker. Such an arrangement may be provided on any of the types shown to vary the setting of the breaker and cause it to open on various current values.

Figure 35:
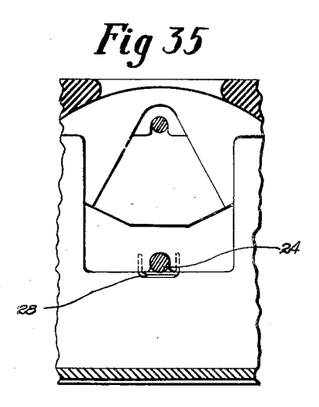
Fig. 35 is a longitudinal section through the circuit breaker housing showing an optional method of supporting the contact carrier.
Figure 36:
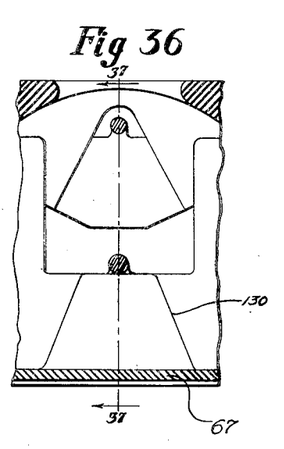
Fig. 36 is a longitudinal section through the circuit breaker showing another method of supporting the contact carrier.
Figure 37:
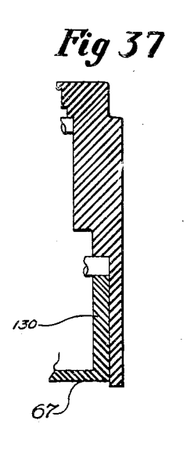
Fig. 37 is a view along line 37—37 of Fig. 36.

Figures 35–37 show optional methods of holding the pivot pin 24 in position. In Figure 35, the numeral 128 indicates metallic pieces which may be moulded in the insulating housing and may be bent over to hold the pin 24 in position as shown.

Figures 36 and 37 illustrate a method of holding the pin 24 in place by utilizing a projection 130 which may be formed on or secured to the cover 67.

Figure 38:
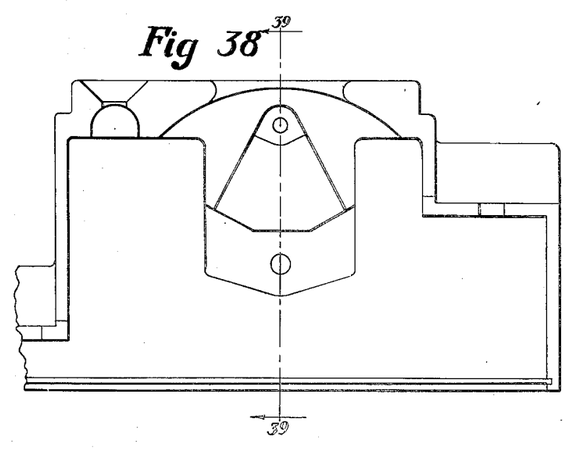
Fig. 38 is a longitudinal view of a housing for the circuit breaker which may be formed in two split sections and Fig. 39 is a view along line 39—39 of Fig. 38.
Figure 39:
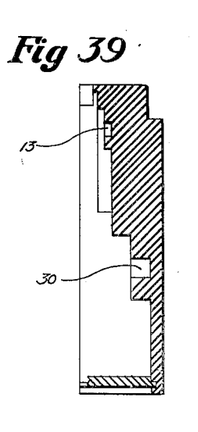
Figure 39A:
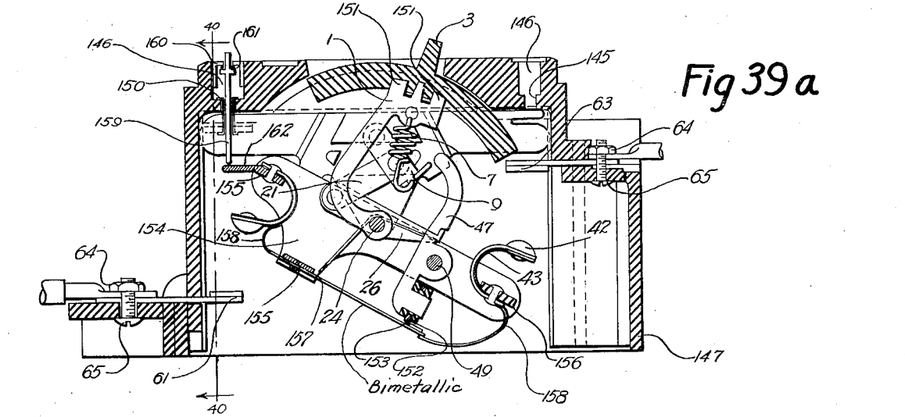
Fig. 39a shows an assembled cross-sectional view of another form of circuit breaker of my invention.

Figures 38 and 39 show how the circuit breaker housing may be formed in two half sections in which case the recesses 13 and 30 may be completely circular instead of having a portion open to allow the insertion of the cooperating pin members. Since the housing is composed of two halves, the parts may be assembled in one half and the other half may then be slipped over the parts which ride in the recesses to properly secure them in position.

Figures 39a-45 show another form of my invention in which I use supporting frame members 140 spaced apart by flat metal connecting bars 143 and 144. The members 140 are provided with openings 141 and 142 to accommodate the portion 11 of the swinging member 9 and the axle 24 respectively. The flat bar 143 may be secured to the insulated housing by a rivet 146 passing through an opening 145 in the housing 147. The other member 144 may be secured to the supporting frame members 140. If the other parts are then assembled between the supporting members they may be inserted into the housing to fit into the slots 148. The ends of the supporting members provided with the slots 149 are inserted first so that the slots will embrace the member 143 which has been previously secured to the housing. The member 144 may then be secured to the housing by a rivet 150.

It would be possible, of course, to secure the supporting frame structure to the housing in other ways if so desired. The supporting frame structure could be secured to the sides or rear of the housing.

The actuator 1 is slightly changed over the actuator 1 previously described in that the insulating handle 3 fits over three projections 151. These projections are made long enough to keep the handle from wobbling. The shield 5 maintains the handle in position on the projections by contact with the housing. The end of the member 47 is also slightly changed in that it is provided with insulating members 152 which keep the metal part 153 from contact with the member 47. The contact carrier may be constructed in this form of the invention with two sides 154 which may be metal stampings held together by metal cross members 155 and a cross member of insulating material 156. The thermal element 157 as shown is straight and is connected to the contacts by flexible conductors 158.

An improved indicating device is provided by an indicator stem 159 which projects through the hollow rivet 150 and is held in position by a cap 160 which fits tightly into the opening 146 and a spring 161 which normally holds the indicator stem down until it is pushed up by the member 162 which is secured to the contact carrier. The indicator will then rise whenever the contacts are broken whether due to manual operation or to circuit overload.

Figures 40, 41, 41A, 42:
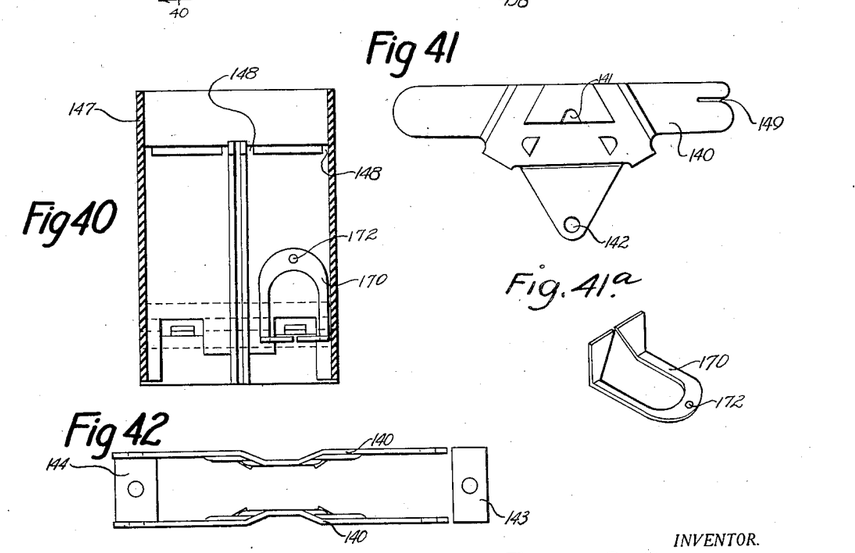
Fig. 40 is a sectional view through line 40—40 of the housing shown in Fig. 39a without the breaker parts. The housing shown is one which will accommodate two circuit breakers.
Fig. 41 is a side view of one of the supporting frame members used in this form of the invention.
Fig. 41a is a perspective view of an arc quencher which may be used in the circuit breaker.
Fig. 42 is a plan view of the supporting frame structure used in this form of the invention.

The housing shown in Figure 40 accommodates two independent breakers which may be referred to as a multipole circuit breaker section.

A device to materially reduce the arcing at the circuit contacts is indicated by the numeral 170 and may consist of a piece of magnetic iron shaped and placed substantially as shown. 172 is an opening through which a rivet or other fastening device may be inserted to secure the device 170 to the housing.

Figure 43:
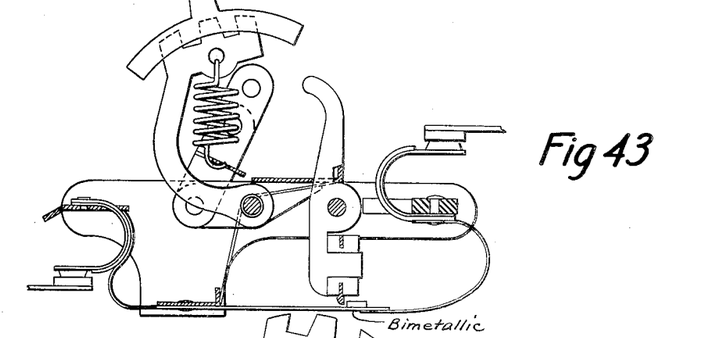
Fig. 43 shows the circuit breaker without the housing and in the "on" position.
Figures 44, 45:
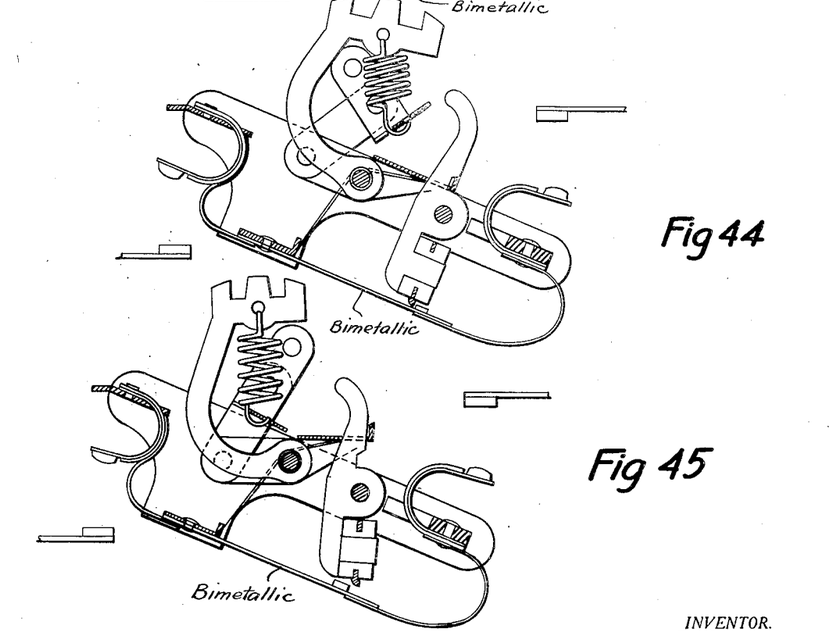
Fig. 44 is similar to Fig. 43 but the circuit breaker is in the "off" position.
Fig. 45 shows the breaker in the tripped position.

The Figures 43-45 show the circuit breaker in "on," "off," and "tripped" positions. The operation of this form of the breaker is the same as previously described in connection with the other form of the invention.

While several embodiments of the invention have been shown and described, it will become apparent to those skilled in the art that various modifications, omissions, changes, additions, and substitutions may be made in the apparatus described without departing from the spirit and scope of the invention as set forth in the appended claims.

I claim:

1. A circuit breaker comprising a unitary housing of insulating material, a pivoted contact carrier carried by supporting frame members, said supporting frame members being adapted to be inserted from the rear of the housing and secured to the face of the housing, said unitary housing enclosing the circuit breaker operating parts on the sides and front, an actuator handle extending through the housing face, said housing face being adapted to form the deadfront face of a panelboard or circuit breaker.

2. A circuit breaker comprising a unitary housing of insulating material, a pivoted contact carrier supported in said housing, an actuator handle extending through the face of the housing, said actuator handle being releasably connected to said contact carrier, the circuit breaker operating parts being adapted to be inserted from the rear of the housing to be secured to the housing, said unitary housing enclosing the circuit breaker operating parts on the sides and front, said housing face being adapted to form the deadfront of a circuit breaker or panelboard.

3. In a circuit breaker, a housing, a moving contact carrier and an actuator therefor supported in said housing, a rotatable indicator supported in the housing and having a portion thereof visible through an opening in the housing, a tail bar on the indicator adapted to engage a projection of the contact carrier when the actuator is in one position and means to prevent the engagement of the tail bar and the projection of the contact carrier when the actuator is in another position.

4. In a circuit breaker an insulating housing, supporting frame members secured thereto, a contact carrier provided with contacts on either end and supported by the supporting frame members, cooperating contacts secured to said housing, a swinging member pivoted at one end thereof in said supporting frame members and releasably connected to the contact carrier and an actuator connected by means of a tensioned spring to the other end of said swinging member.

5. In a circuit breaker an insulated housing provided with sidewalls and a front face, a pair of oppositely placed supporting frame members spaced apart by flat connecting members positioned against the rear of the front face of the insulated housing, means to secure said flat connecting members to said housing, an indicator adapted to be inserted in an opening through one of said securing means, a contact carrier supported by said supporting frame members, the indicator being so positioned as to be struck by the contact carrier to indicate whether the contact carrier is in the off or on position.

6. In a circuit breaker, a housing, an opening through the face of the housing, an indicator stem extending through the opening and adapted to be moved by a part of the circuit breaker, an insert in said opening provided with an opening through which the indicator extends and a spring under the insert adapted to maintain the indicator in a non-indicating position until struck by the circuit breaker part.

7. In a multipole circuit breaker a pivoted contact carrier for each pole, an actuator for operating each contact carrier and means connecting all of the actuators to operate the actuators as a unit into open or closed position, a latch means holding each contact carrier for movement with its respective actuator, thermal means on each contact carrier adapted to release its latch on an overcurrent condition, a bar connecting the respective latch members of each contact carrier to cause all of the latch means to move together to release all of the contact carriers from their respective actuators whenever any one of the thermal means releases its latch.

8. In a circuit breaker a housing of insulating material provided with sidewalls and a front, supporting frame members spaced apart by flat connecting members, said supporting members being secured to the front of the housing by securing the flat members to the front of the housing, an actuator provided with a handle which extends from an opening in the housing, a shield around said opening movable with the handle, a contact carrier pivotally supported on the supporting frame members and provided with two oppositely disposed contacts, a thermal element electrically connected between the contacts adapted to release the contact carrier for movement independent of the actuator when a current in excess of a predetermined value flows through the breaker.

9. In a circuit breaker an insulating housing, supporting frame members secured to said housing, a contact carrier pivotally supported on said frame members, a swinging member pivotally supported at one end thereof by said frame members, projections on said frame members to limit the movement of the swinging member, an actuator, a tensioned spring connecting the actuator to the swinging member and means releasably connecting the swinging member with the contact carrier.

10. A circuit breaker including a plurality of walls forming a housing, recesses in certain of said walls, a contact carrier pivotally supported in certain of said recesses, a swinging member pivotally supported in other of said recesses, actuating means for said swinging member, means releasably interlocking said swinging member with the carrier for conjoint pivotal movement and a current responsive means on said carrier to release the carrier for movement independently of said swinging member.

11. A circuit breaker comprising a plurality of walls to form a housing, recesses in said walls, an actuator, a contact carrier with contacts thereon pivotally supported in said recesses, cooperating contacts located on said housing, means for releasably connecting the actuator with said carrier, and a current responsive means on said carrier to release the carrier for movement independent of said actuator.

12. A circuit breaker comprising a housing composed of a plurality of walls and having the rear side thereof open, an actuator therefor, pivotally movable members, said housing being provided with an opening in the front wall thereof through which a portion of the actuator extends, certain of said walls being provided with recesses which serve as bearings for certain of said pivotal members, and a housing cover adapted to close the rear opening of the housing and to cooperate with other of said recesses to form bearings for other of said pivotal members.

13. In a circuit breaker, a housing with an open back formed by a plurality of walls, pivotally movable members, an actuator, a cover for the open back of the housing, said housing being provided with recesses in certain walls thereof, the recesses being adapted to serve as bearings for the pivotal members, said cover being adapted to cooperate with the housing and recesses therein to hold certain of the pivotal members in operating position, said housing being provided with an opening in the wall opposite the cover through which a portion of the actuator handle extends and a current responsive means rendering the operation of other of the pivotally mounted members independent of said actuator under certain current conditions.

14. A circuit interrupter comprising a housing composed of a plurality of walls and having the rear side thereof open, pivotally movable members, an actuator therefor, said housing being provided with an opening in a wall thereof through which a portion of the actuator extends, certain of said walls being provided with recesses which serve as bearings for certain of said pivotal members and a housing cover adapted to close the rear opening of the housing and to cooperate with other of said recesses to form bearings for other of said pivotal members and to hold said pivotal members and actuator in proper position in the housing.

15. A circuit breaker including in combination with a pivoted member and manual means for actuating the same, of a contact carrier pivoted coaxially with said member, a latch bar pivoted on the contact carrier, normally connecting said member and carrier for conjoint pivotal movement, a current responsive element mounted on said carrier, operable to disconnect the latch bar from said member when influenced by current of predetermined magnitude, and a spring tending to rotate the contact carrier independently of said member.

16. A circuit breaker comprising a pivoted contact carrier, a member pivoted coaxially with the contact carrier, a latch bar for normally interconnecting said member and carrier for conjoint pivotal movement, actuating mechanism for said member including an element which is engageable with said latch bar to cause the same to interconnect said member and contact carrier, and current-responsive means on said carrier operable on said latch bar to effect disconnection of said member and carrier.

17. In a circuit breaker, a pivoted actuator, a pivoted member actuatable thereby, snap-acting means operatively interconnecting said actuator and member, comprising a swinging member and a spring connecting it with said actuator, a pivoted contact carrier, means releasably connecting said contact carrier and member for conjoint pivotal movement, and current responsive means effective to disconnect said member and carrier.

18. In a circuit breaker, a pivoted actuator, a pivoted member actuatable thereby, snap-acting means operatively interconnecting said actuator and member, comprising paired toggle links and a spring connecting one thereof with said actuator, a contact carrier pivoted coaxially with said member, a spring tending to rotate the contact carrier relative to said member, an element releasably connecting said member and carrier for conjoint movement, and current responsive means on said carrier effective to release the carrier from said member for independent opening movement under the action of said last named spring.

19. In a circuit breaker, an actuator, a pivoted member movable thereby, snap-acting means operatively interconnecting said actuator and member, comprising paired toggle-links and a spring connecting one thereof with said actuator; a pivoted contact carrier, a latch bar thereon releasably interconnecting said carrier and member for conjoint pivotal movement, said latch bar extending into the path of movement of one of said toggle links and adapted to be moved thereby into latching engagement with said member.

20. In a circuit breaker, an actuator, a pivoted member movable thereby, snap-acting means operatively interconnecting said actuator and member, comprising paired toggle-links and a spring connecting one thereof with said actuator; a pivoted contact carrier, means for releasably latching said carrier and member for conjoint pivotal movement, a current-responsive element on said carrier normally holding said latch means in latching position, operable, when affected by current of predetermined magnitude, to release said carrier from said member, said latch means being adapted to be reset into latching position by the movement of one of said toggle links.

21. In a circuit breaker, a pivoted member and manually operable, snap-acting mechanism for oscillating the same, a pivoted contact carrier and means releasably interlocking said carrier and member for conjoint pivotal movement, said contact carrier comprising a pair of laterally spaced frame pieces insulated one from the other, a current-responsive element on said carrier electrically interconnecting said frame pieces and cooperable with said interlocking means to release the carrier from said member, a switch contact on one of said frame pieces and a switch contact on the other frame piece.

22. In a circuit breaker, a contact carrier pivoted between its ends and comprising laterally spaced frame pieces secured on opposite sides of an insulating core of molded plastic material, switch contacts at opposite ends of said carrier, electrically connected respectively to opposite frame pieces, and an element mounted on said carrier and electrically interconnecting the frame pieces, said element being adapted to move responsive to the passage of current therethrough, to effect opening movement of the circuit breaker.

23. In a circuit breaker a pivoted contact carrier, a flat actuator for snap operating said contact carrier into open and closed position, locking means to lock the contact carrier for movement with the actuator, thermal means on the contact carrier for releasing the locking means when a current in excess of a predetermined value flows through the circuit breaker, said actuator being flat and provided with a plurality of projections on one end thereof and a handle of insulating material provided with slots therein adapted to fit over the projections on the actuator.

24. In a circuit breaker a housing of insulating material, a pivoted contact carrier supported therein, a flat actuator for operating said pivoted contact carrier, a plurality of flat projections on said actuator, a handle of insulating material provided with a shield at one end thereof, slots in said shield adapted to fit over the projections on the actuator, an opening in the front of the housing through which an end of the handle extends, the handle being held in position by contact of the shield against the inner side of the housing and by the projections on the actuator.

25. A circuit breaker comprising a unitary housing of insulating material having sidewalls and a deadfront face, a contact carrier supported in said housing, an actuator provided with a handle extending through an opening in the deadfront face, a contact on the housing, a cooperating contact on the contact carrier, said contact carrier and actuator being operatively connected, current responsive means electrically connected with one of the contacts and effective to release the contact carrier for movement independent of the actuator, said sidewalls and deadfront of the unitary housing forming a cavity with an opening at the rear of the circuit breaker for the insertion of the circuit breaker operating parts, and means to secure said parts to said housing and support them therefrom.

26. A circuit breaker comprising a housing composed of complementary vertical sections of insulating material, means for securing the sections together in operative position, an actuator provided with a handle extending through an opening in the face of said housing, a contact carrier supported in said housing and operatively connected with said actuator, current responsive means in said housing effective to release the contact carrier for movement independent of the actuator, said complementary sections provided with complementary recesses forming an enclosed chamber for the accommodation of the circuit breaker parts.

27. A circuit breaker comprising a housing composed of complementary vertical sections of insulating material, means for securing the sections together in operative position, an actuator provided with a handle extending through an opening in the front of the circuit breaker, a contact carrier operatively connected with the actuator, current responsive means effective to release the contact carrier for movement independent of the actuator when the current through the circuit breaker exceeds a predetermined value, cooperating recesses in the opposite vertical sections of the housing forming supports for the actuator and contact carrier.

28. A circuit breaker comprising a housing composed of complementary vertical sections of insulating material, means for securing the sections together in operative position, an actuator provided with a handle extending through the face of the circuit breaker, opposite and complementary recesses in each of the vertical sections forming bearings for rotatably supporting the actuator, a contact carrier supported in complementary recesses in opposite vertical sections, said contact carrier operatively connected for operation by the actuator, and current responsive means effective to release the contact carrier for movement independent of the actuator, said vertical housing sections enclosing the circuit breaker parts.

FLOYD S. GREEN.

DISCLAIMER 2,222,312.—*Floyd S. Green*, St. Louis, Mo. CIRCUIT BREAKER. Patent dated November 19, 1940. Disclaimer filed June 12, 1942, by the inventor and the assignee, *Frank Adam*.

Hereby disclaim claims 13, 14, 26, 27, and 28 of aforesaid patent.

[*Official Gazette July 7, 1942.*]